US011893248B2

(12) United States Patent
Segev et al.

(10) Patent No.: US 11,893,248 B2
(45) Date of Patent: Feb. 6, 2024

(54) SECURE METADATA PROTECTION

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/670,087

(22) Filed: Feb. 11, 2022

(65) Prior Publication Data

US 2023/0259289 A1 Aug. 17, 2023

(51) Int. Cl.
*G06F 3/06* (2006.01)
*G06F 11/10* (2006.01)
*G06F 21/78* (2013.01)
*G06F 21/60* (2013.01)

(52) U.S. Cl.
CPC .......... *G06F 3/0623* (2013.01); *G06F 3/0619* (2013.01); *G06F 3/0659* (2013.01); *G06F 3/0679* (2013.01); *G06F 11/1004* (2013.01); *G06F 21/602* (2013.01); *G06F 21/78* (2013.01)

(58) Field of Classification Search
None
See application file for complete search history.

(56) References Cited

U.S. PATENT DOCUMENTS

| | | | |
|---|---|---|---|
| 7,185,161 B2 * | 2/2007 | Kang ...................... G06F 21/80 | 711/152 |
| 8,453,018 B2 | 5/2013 | Stenfort | |
| 8,578,477 B1 * | 11/2013 | Lin ........................ G06F 21/554 | 726/21 |
| 8,782,804 B2 * | 7/2014 | Nagai .............. G11B 20/00137 | 726/28 |
| 10,025,534 B1 * | 7/2018 | Naing .................... G06F 3/0658 | |
| 10,210,073 B1 * | 2/2019 | Baruch ............... G06F 11/3664 | |
| 10,691,592 B2 | 6/2020 | Harris et al. | |
| 2006/0190772 A1 * | 8/2006 | Hanaoka ............... H04L 1/0082 | 714/38.12 |
| 2010/0077472 A1 * | 3/2010 | Kaabouch ............... G06F 21/74 | 726/16 |

(Continued)

FOREIGN PATENT DOCUMENTS

| | | |
|---|---|---|
| CN | 112558884 A | 3/2021 |
| DE | 102015201599 A1 | 8/2016 |
| WO | 2017214219 A1 | 12/2017 |

*Primary Examiner* — Yaima Rigol

(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to receive a read command from a host device to read data from the memory device, fetch the read data from the memory device, check metadata associated with the read data, determine if the metadata corresponds to the read command, and provide modified read data to the host device when the metadata does not correspond to the read command. The modified read data may be encrypted read data, corrupted read data, or read data that is replaced with debug information. When the host device receives data that is different than the read data that is requested, the modified read data may be unreadable to the host device so that unprivileged access to the read data may be avoided.

20 Claims, 6 Drawing Sheets

(56) References Cited

U.S. PATENT DOCUMENTS

| | | | |
|---|---|---|---|
| 2013/0036465 A1* | 2/2013 | Chuan | G06F 21/85 |
| | | | 726/22 |
| 2016/0342463 A1 | 11/2016 | Oshima | |
| 2017/0024166 A1* | 1/2017 | Singh | G06F 12/0246 |
| 2017/0155511 A1* | 6/2017 | Haridas | H04L 9/3263 |
| 2020/0201785 A1* | 6/2020 | Hanna | G11C 16/14 |
| 2020/0272580 A1* | 8/2020 | Lu | G06F 12/1408 |
| 2020/0293206 A1* | 9/2020 | Isozaki | H04L 9/088 |
| 2021/0391985 A1* | 12/2021 | Bhunia | H04L 9/0861 |
| 2022/0114002 A1* | 4/2022 | Hoogerbrugge | G06F 21/79 |

* cited by examiner

SECURE METADATA PROTECTION

BACKGROUND OF THE DISCLOSURE

Field of the Disclosure

Embodiments of the present disclosure generally relate to data storage devices, such as solid state drives (SSDs), and, more specifically, protecting data from being accessed from a host device that does not have permission to access the data.

Description of the Related Art

Data storage devices operate under one or more protocols. For example, non-volatile memory (NVM) express (NVMe) protocol allows for multiple partition (e.g., namespaces) to co-exist on the data storage device. In some examples, each virtual function, host, or user is given access rights to a dedicated one or more namespaces. In order to protect data from being accessed from a non-privileged host device or, in other words, in order to ensure that a host device receives the correct data, the data stored in a memory device of the data storage device is protected with metadata.

In order to meet performance requirements, the work of the data path of the data storage device is automated. The data is scheduled to be sent to the host device goes through each process of the data path, such as decryption, decoding, and error correction, before being sent to the host device. When the data is sent to the host device, the allocated resources for the data transfer operation are released. However, for security reasons, it is important to transfer data to a host device that belongs to the host device. In other words, data of other host devices should not be transferred to a requester unless the data is of the requester.

Therefore, there is a need in the art to protect data from being accessed by host devices that do not have permission to access the data.

SUMMARY OF THE DISCLOSURE

The present disclosure generally relates to data storage devices, such as solid state drives (SSDs), and, more specifically, protecting data from being accessed from a different host device than a originating host device. A data storage device includes a memory device and a controller coupled to the memory device. The controller is configured to receive a read command from a host device to read data from the memory device, fetch the read data from the memory device, check metadata associated with the read data, determine if the metadata corresponds to the read command, and provide modified read data to the host device when the metadata does not correspond to the read command. The modified read data may be encrypted read data, corrupted read data, or read data that is replaced with debug information. When the host device receives data that is different than the read data that is requested, the modified read data may be unreadable to the host device so that unprivileged access to the read data may be avoided.

In one embodiment, a data storage device includes a memory device and a controller coupled to the memory device. The controller is configured to receive a read command from a host device to read data from the memory device, fetch the read data from the memory device, check metadata associated with the read data, determine if the metadata corresponds to the read command, and provide modified read data to the host device when the metadata does not correspond to the read command.

In another embodiment, a data storage device includes a memory device and a controller coupled to the memory device. The controller includes a host interface module (HIM) and a direct memory access (DMA) coupled to the HIM. The DMA is configured to fetch metadata associated with a read command, wherein the read command has a first data identifier, and wherein the fetched metadata has a second data identifier, fetch data associated with the read command, wherein the fetched data has a third data identifier, determine if the first data identifier, the second data identifier, and the third identifier match, and provide a requester of the read command either unmodified fetched data when the first data identifier, the second data identifier, and the third identifier match or modified fetched data when the first data identifier, the second data identifier, and the third identifier do not match.

In another embodiment, a data storage device includes memory means and a controller coupled to the memory means. The controller is configured to provide modified data in response to a read command when there is a mismatch between either metadata associated with read data corresponding to the read command and the read command or a calculated cyclic redundancy code (CRC) of the read data and the read command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, protecting data from being accessed from a different host device than the originating host device. A data storage device includes a memory device and a controller coupled to the memory device. The controller is configured to receive a read command from a host device to read data from the memory device, fetch the read data from the memory device, check metadata associated with the read data, determine if the metadata corresponds to the read command, and provide modified read data to the host device when the metadata does not correspond to the read command. The modified read data may be encrypted read data, corrupted read data, or read data that is replaced with debug information. When the host device receives data that is different than the read data that is requested, the modified read data may be unreadable to the host device so that unprivileged access to the read data may be avoided.

Figure 1:
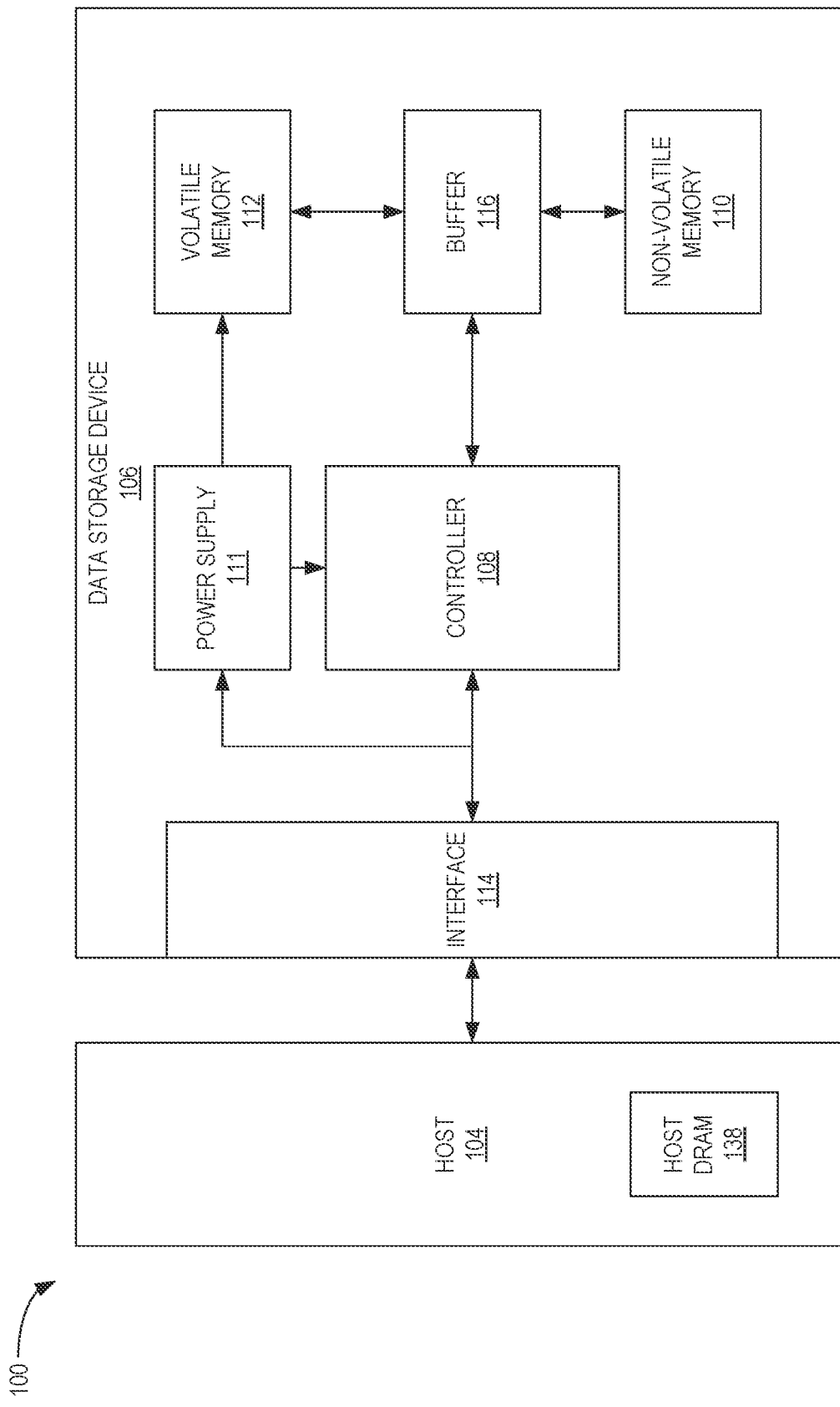
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
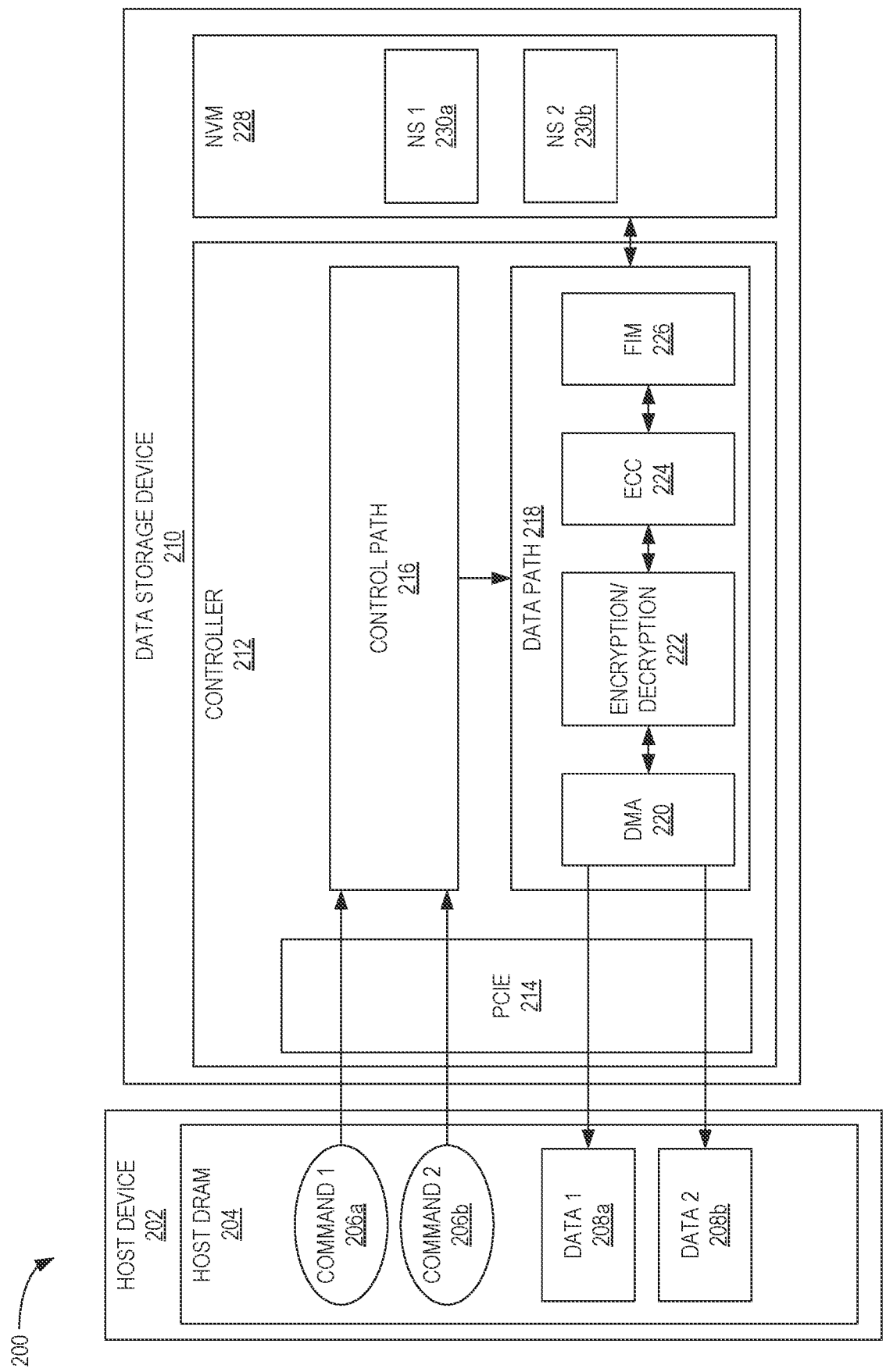
FIG. 2 is a schematic block diagram illustrating a storage system in which a data storage device may function as a storage device having a plurality of namespaces for a host device, according to certain embodiments.

FIG. 2 is a schematic block diagram illustrating a storage system 200 in which a data storage device 210 may function as a storage device having a plurality of namespaces (e.g., NS 1 230a and NS 2 230b) for a host device 202, according to certain embodiments. Aspects of the storage system 200 may be similar to the storage system 100 of FIG. 1. For example, the host device 202 may be the host device 104 and the data storage device may be the data storage device 106.

The host device 202 includes a host DRAM 204. The host DRAM 204 may include a submission queue for storing commands to be fetched by controller 212 of the data storage device 210 or sent to the controller 212 and a completion queue for receiving completion messages and interrupts from the controller 212 in response to a completed command. The host device 202 includes one or more virtual machines or virtual functions. Each of the virtual machines or virtual functions may be associated with one or more namespaces (NS) of the data storage device 210. For example, host DRAM 204 has two namespaces, where a first namespace queues command 1 206a and a second namespace queues command 2 206b. Command 1 206a and command 2 206b may be stored in the submission queue of the host DRAM 204. In the following example, command 1 206a and command 2 206b are read commands. When command 1 206a and command 2 206b are executed by the controller 212, the respective data (i.e., data 1 208a and data 2 208b is transferred back to the host DRAM 204b, where the data may be stored in the host local DRAM, such as the host DRAM 204, and the completion messages may be stored in the completion queue of the host DRAM 204.

The controller 212 includes a PCIe bus 214, a control path 216, a data path 218, and an NVM 228. Data and commands are transferred to and from the controller 212 and the host device 202 via the PCIe bus 214. Commands, such as command 1 206a and command 2 206b are transferred to the control path 216, where the control path 216 may process the commands and generate instructions. The instructions are passed to the data path 218, where the data path 218 includes a direct memory access (DMA) 220, an encryption/decryption unit 222, an error correction code (ECC) unit 224, and a flash interface module (FIM) 226.

In the following example, command 1 206a and command 2 206b are write commands. Data of the command, such as command 1 206a, first passes through a direct memory access (DMA) 220, where data protection is added to the data. The data is then encrypted at the encryption/decryption unit 222. The data is then passed to the ECC unit 224, where the ECC unit 224 generates and writes error-correction code or parity data to the data. FIM 226 writes the data to the relevant location of the NVM 228. In the current example, data of command 1 206a (i.e., data 1 208a) is programmed to NS 1 230a. Likewise, the data of command 2 206b (i.e., data 2 208b) is programmed to NS 2 230b.

When data is read from the NVM 228, the data is transferred back from the NVM 228 to the data path 218. The data is decoded, decrypted, and then provided back to the requester, such as the host device 202. For example, when command 1 206a is a read command, data 1 208a is read from NS 1 230a and sent back to the host DRAM 204. Likewise, when command 2 206b is a read command, data 2 208b is read from NS 2 230b and sent back to the host DRAM 204.

Figure 3:
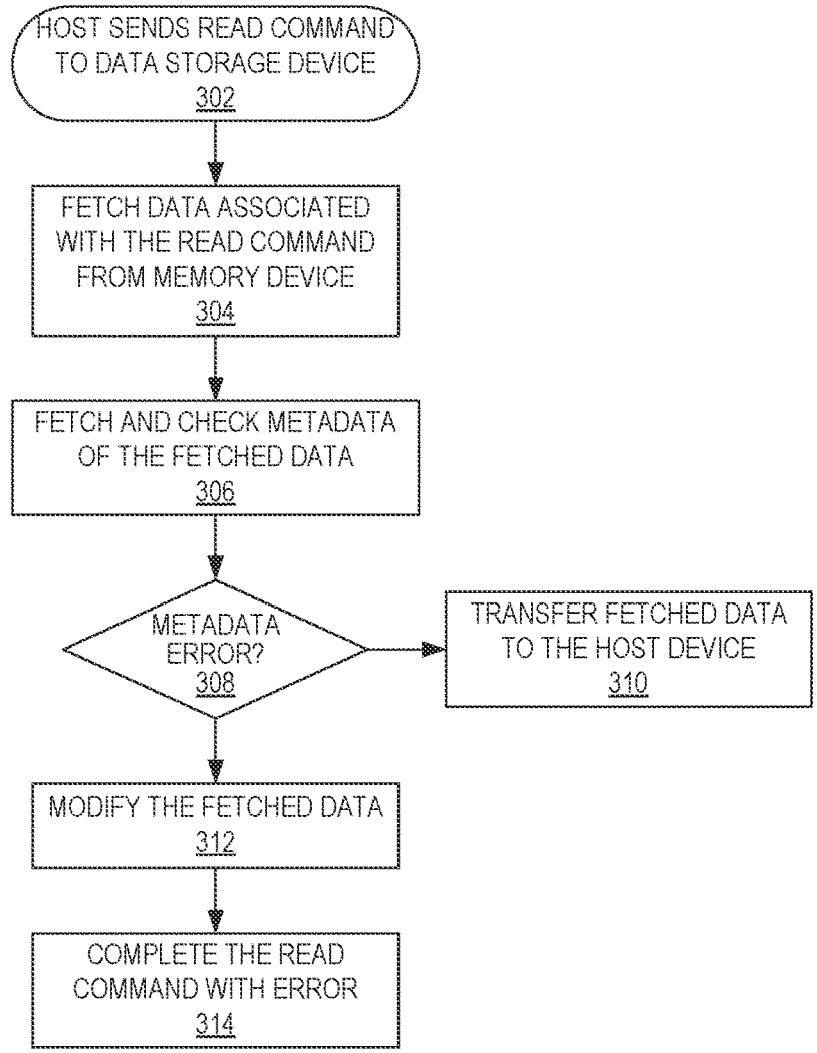
FIG. 3 is a flow diagram illustrating a method of sending data to a host device, according to certain embodiments.

FIG. 3 is a flow diagram illustrating a method 300 of sending data to a host device, according to certain embodiments. Method 300 may be implemented by a controller, such as the controller 108 of FIG. 1 or the controller 212 of FIG. 2. For exemplary purposes, aspects of the storage system 200 of FIG. 2 may be referenced herein.

At block 302, the host device 202 sends a read command, such as command 1 206a, to the data storage device 210. In some examples, the read command may be fetched by the controller 212 from a submission queue of the host device 202. At block 304, the controller 212 fetches data associated with the read command from the NVM 228. For example, because command 1 206a is associated with NS 1 230a, the corresponding data is fetched from NS 1 230a. At block 306, the controller 212 fetches and checks the metadata of the fetched data.

At block 308, the controller 212 determines if there is an error with the metadata. For example, the error may arise from the metadata of the fetched data not matching the data signifiers of the read command. In other examples, the controller 212 may generate cyclic redundancy code (CRC) using the fetched data. The calculated CRC may be compared to an expected CRC from the metadata and an actual CRC from the read command. If any of the CRCs do not match, then the controller 212 may determine that the requester (i.e., the generator of the read command received at block 302) does not have permission to access the fetched data. In another example, the expected namespace corresponding to the fetched metadata may be compared with the actual namespace from the read command. If the expected namespace and the actual namespace do not match, then the controller 212 may determine that the requester (i.e., the generator of the read command received at block 302) does not have permission to access the fetched data. In yet another example, the controller 212 may compare an expected LBA corresponding to the fetched metadata to an actual LBA of the read command. If the expected LBA and the actual LBA do not match, then the controller 212 may determine that the requester (i.e., the generator of the read command received at block 302) does not have permission to access the fetched data.

It is to be understood that the terms "expected", "actual", and "calculated" are not intended to be limiting, but to exemplify a difference between information of the CRCs, the LBAs, and the namespaces.

If the controller 212 determines that there is no error with the metadata, such that the relevant CRCs, LBAs, and namespaces match, at block 308, then the fetched data is provided to the requested (i.e., the host device 202) at 310. However, if the controller 212 determines that there is an error with the metadata, such that the relevant CRCs, LBAs, and namespaces match, at block 308, then the controller 212 modifies the fetched data at block 312. The modifying of the fetched data may include corrupting the fetched data, encrypting the fetched data, and/or replacing at least a portion of the fetched data with debug information. The debug information may include information regarding the error in the comparison as well as other indications.

At block 314, the controller 212 completes the read command with an error. Completing the read command may include sending an interrupt and a completion message to the host device 202. The completion message may include an error indication in order to inform the host device 202 that the fetched data that was requested at block 302 is modified. Thus, the host device 202 may be aware of that the fetched data that is sent to the host device 202 from the controller 212 is not the data that was requested.

Figure 4A:
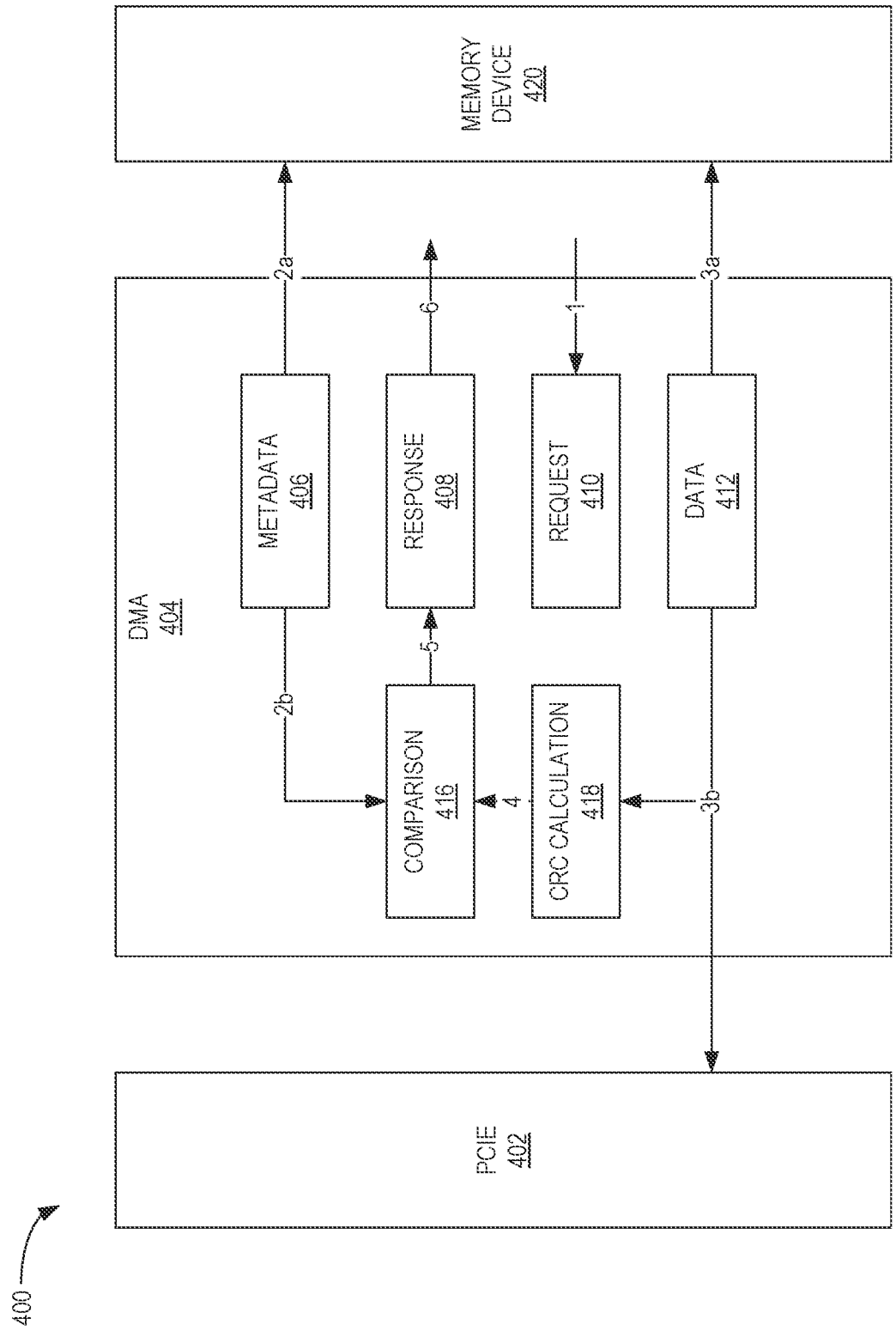
FIG. 4A is a block diagram illustrating a DMA operation, according to certain embodiments.

FIG. 4A is a block diagram illustrating a DMA operation 400, according to certain embodiments. Method 300 may be implemented by the DMA 404. For example, the DMA operation 400 may utilize at least a portion of method 300. The DMA operation 400 includes a PCIe bus 402, a DMA 404, and a memory device 420. Aspects of the storage system 200 of FIG. 2 may be similar to aspects of the DMA operation 400. For example, the PCIe bus 402 may be the PCIe bus 214, the DMA 404 may be the DMA 220, and the memory device 420 may be the NVM 228.

The DMA 404 includes a metadata unit 406, a response unit 408, a request unit 410, a data unit 412, a comparison unit 416, and a CRC calculation unit 418. DMA operation 400 begins at stream 1, where the request unit 410 receives a read command for read data, which may also include pointers for the data and metadata in volatile memory, such as SRAM or DRAM, along with the namespace and LBA of the data. The request unit 410 may act as a control unit for the other units of the DMA 404. At stream 2a, the metadata unit 406 fetches the metadata associated with the relevant read data from the memory device 420. At stream 2b, the fetched metadata is provided to the comparison unit 416. At stream 3a, the data unit 412 retrieves the relevant read data corresponding to the read command from the memory device 420. The relevant read data is passed to the CRC calculation unit 418 and to the PCIe bus 402 at stream 3b. The CRC calculation unit 418 calculates the actual CRC of the of the relevant read data.

The results of the CRC calculation at the CRC calculation unit 418 are passed to the comparison unit 416 at stream 4. For exemplary purposes, the results of the CRC calculation may be referenced as a "calculated CRC" and the CRC associated with the fetched metadata may be referred to as an "expected CRC". At stream 5, the comparison unit 416 passes the result of the comparison of the comparing (e.g., comparing the actual CRC, the expected CRC, and the calculated CRC, comparing the actual LBA and the expected LBA, and comparing the actual namespace and the expected namespace) to the response unit 408. The result may either be a pass or a fail. For example, if the result is a pass, then the comparing actual CRC, the expected CRC, and the calculated CRC, comparing the actual LBA and the expected LBA, and comparing the actual namespace and the expected namespace passed. However, if the result is a fail, then the comparing the actual CRC, the expected CRC, and the calculated CRC, comparing the actual LBA and the expected LBA, and comparing the actual namespace and the expected namespace failed, or, in other words, the relevant comparisons did not match. At stream 6, the response unit 408 provides the response to the requester, such as the host device 202.

Figure 4B:
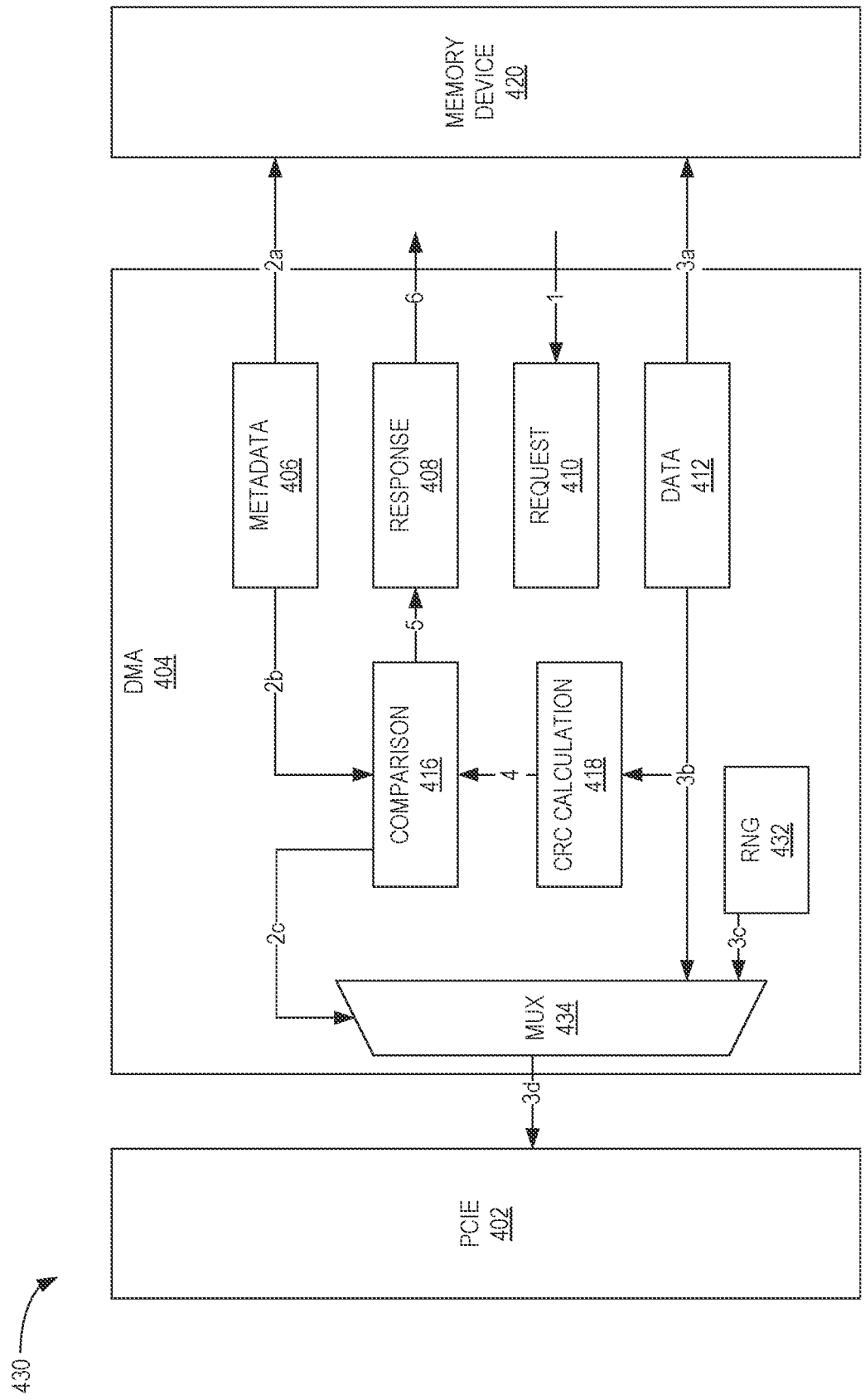
FIG. 4B is a block diagram illustrating a DMA operation, according to certain embodiments.

FIG. 4B is a block diagram illustrating a DMA operation 430, according to certain embodiments. Method 300 may be implemented by the DMA 404. For simplification purposes, aspects of the DMA operation 430 and the DMA operation 400 that are similar are referenced with the same reference numeral.

The DMA 404 includes the metadata unit 406, the response unit 408, the request unit 410, the data unit 412, the comparison unit 416, the CRC calculation unit 418, a multiplexer unit (mux) 434, and a random number generator (RNG) unit 432. The mux 434 may receive multiple inputs and outputs a single output. The RNG unit 432 may generate random data related to the fetched read data or modify the fetched read data random data. For example, the random data may be modified data, where the modified data is either corrupted data, encrypted data, and/or the read data that has at least a portion replaced with debug information.

DMA operation 430 begins at stream 1, where the request unit 410 receives a read command for read data, which may also include pointers for the data and metadata in volatile memory, such as SRAM or DRAM, along with the namespace and LBA of the data. The request unit 410 may act as a control unit for the other units of the DMA 404. At stream 2a, the metadata unit 406 fetches the metadata associated with the relevant read data from the memory device 420. At stream 2b, the fetched metadata is provided to the comparison unit 416. At stream 3a, the data unit 412 retrieves the relevant read data corresponding to the read command from the memory device 420. The relevant read data is passed to the CRC calculation unit 418 and to the mux 434 at stream 3b. The CRC calculation unit 418 calculates the actual CRC of the of the relevant read data.

The results of the CRC calculation at the CRC calculation unit 418 are passed to the comparison unit 416 at stream 4. For exemplary purposes, the results of the CRC calculation may be referenced as a "calculated CRC" and the CRC associated with the fetched metadata may be referred to as an "expected CRC". At stream 5, the comparison unit 416 passes the result of the comparison of the comparing (e.g., comparing the actual CRC, the expected CRC, and the calculated CRC, comparing the actual LBA and the expected LBA, and comparing the actual namespace and the expected namespace) to the response unit 408. The result may either be a pass or a fail. For example, if the result is a pass, then the comparing actual CRC, the expected CRC, and the calculated CRC, comparing the actual LBA and the expected LBA, and comparing the actual namespace and the expected namespace passed. However, if the result is a fail, then the comparing the actual CRC, the expected CRC, and the calculated CRC, comparing the actual LBA and the expected LBA, and comparing the actual namespace and the expected namespace has failed, or, in other words, the relevant comparisons did not match.

Furthermore, at stream 2c, the comparison unit 416 passes the result of the comparison to the mux 434, such that the mux 434 is able to select which data (e.g., modified data or fetched read data) to send to the PCIe bus 402. Furthermore, at stream 3c, the RNG unit 432 provides the mux 434 the generated modified data when the actual LBA and the expect LBA do not match or when the actual namespace and the expected namespace do not match, where the generated modified data is random data that replaces the fetched read data. At stream 3d, the results of the mux operation of the mux 434 is passed to the PCIe bus 402. At stream 6, the response unit 408 provides the response to the requester, such as the host device 202.

Figure 4C:
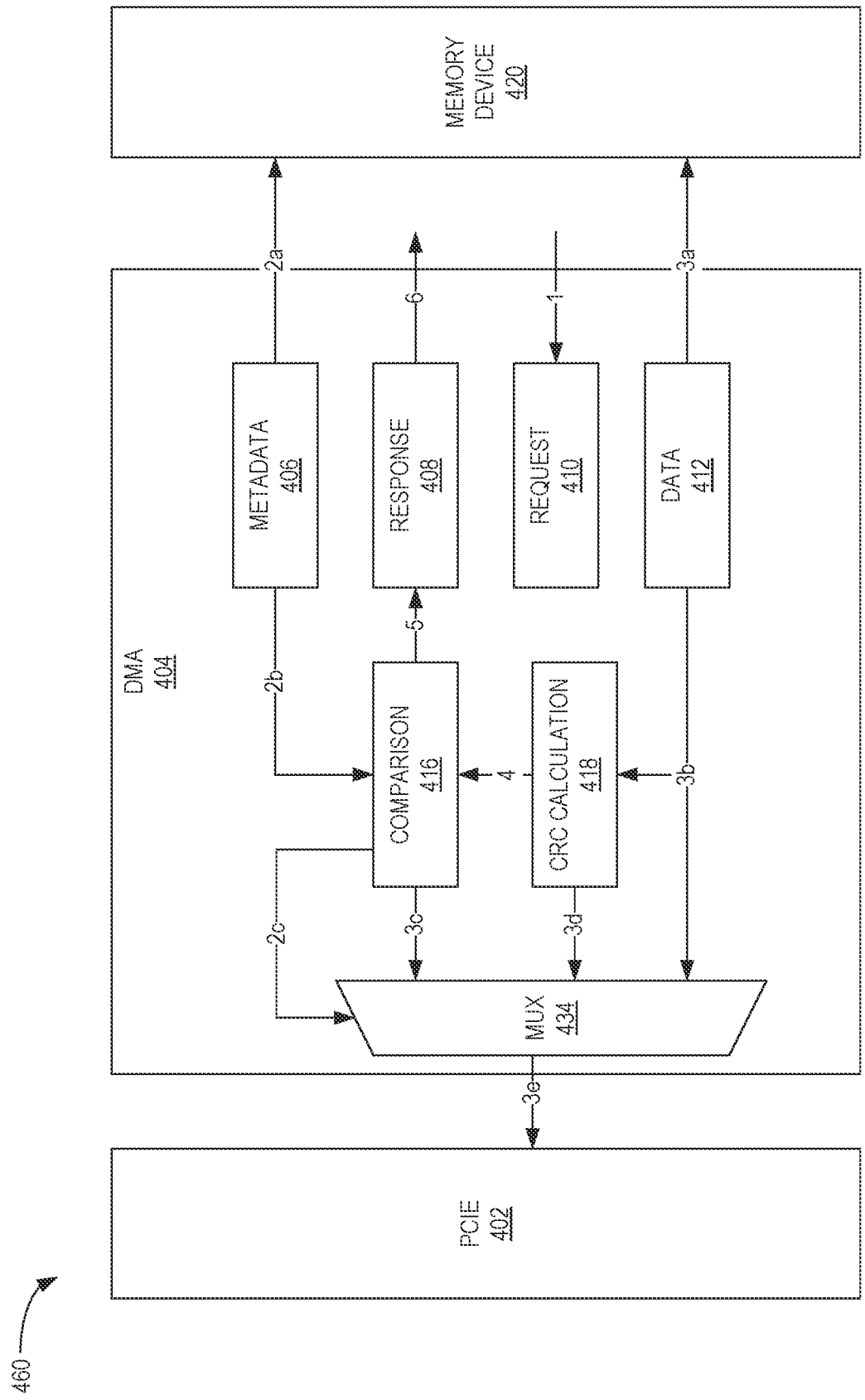
FIG. 4C is a block diagram illustrating a DMA operation, according to certain embodiments.

FIG. 4C is a block diagram illustrating a DMA operation 460, according to certain embodiments. Method 300 may be implemented by the DMA 404. For simplification purposes, aspects of the DMA operation 400, the DMA operation 430, and the DMA operation 460 that are similar are referenced with the same reference numeral.

The DMA 404 includes the metadata unit 406, the response unit 408, the request unit 410, the data unit 412, the comparison unit 416, the CRC calculation unit 418, and the mux 434. DMA operation 460 begins at stream 1, where the request unit 410 receives a read command for read data, which may also include pointers for the data and metadata in volatile memory, such as SRAM or DRAM, along with the namespace and LBA of the data. The request unit 410 may act as a control unit for the other units of the DMA 404. At stream 2a, the metadata unit 406 fetches the metadata associated with the relevant read data from the memory device 420. At stream 2b, the fetched metadata is provided to the comparison unit 416. At stream 3a, the data unit 412 retrieves the relevant read data corresponding to the read command from the memory device 420. The relevant read data is passed to the CRC calculation unit 418 and to the mux 434 at stream 3b. The CRC calculation unit 418 calculates the actual CRC of the of the relevant read data.

The results of the CRC calculation at the CRC calculation unit 418 are passed to the comparison unit 416 at stream 4. For exemplary purposes, the results of the CRC calculation may be referenced as a "calculated CRC" and the CRC associated with the fetched metadata may be referred to as an "expected CRC". At stream 5, the comparison unit 416 passes the result of the comparison of the comparing (e.g., comparing the actual CRC, the expected CRC, and the calculated CRC, comparing the actual LBA and the expected LBA, and comparing the actual namespace and the expected namespace) to the response unit 408. The result may either be a pass or a fail. For example, if the result is a pass, then the comparing actual CRC, the expected CRC, and the calculated CRC, comparing the actual LBA and the expected LBA, and comparing the actual namespace and the expected namespace passed. However, if the result is a fail, then the comparing the actual CRC, the expected CRC, and the calculated CRC, comparing the actual LBA and the expected LBA, and comparing the actual namespace and the expected namespace failed, or, in other words, the relevant comparisons did not match.

Furthermore, at stream 2c, the comparison unit 416 passes the result of the comparison to the mux 434, such that the mux 434 is able to select which data (e.g., modified data or fetched read data) to send to the PCIe bus 402. Furthermore, at stream 3c, the comparison unit 416 provides the mux 434 the expected LBA, the expected namespace, and the expected LBA of the metadata and the actual LBA, the actual namespace, and the actual LBA of the read command. At stream 3d, the calculated CRC is passed to the mux 434. Because the expected LBA, the expected namespace, and the expected LBA of the metadata, the actual LBA, the actual namespace, and the actual LBA of the read command, and the calculated CRC are provided to the mux 434, the mux 434 may send the PCIe bus 402 modified read data, where the modified read data may include debug information. At stream 3e, the results of the mux operation of the mux 434 is passed to the PCIe bus 402. At stream 6, the response unit 408 provides the response to the requester, such as the host device 202.

By comparing relevant parts of a read command, the data associated with the read command, and the metadata associated with the data and modifying the data when the comparison fails, unprivileged access to data (e.g., a host device receiving data that the host device does not have permission to read) may be avoided.

In one embodiment, a data storage device includes a memory device and a controller coupled to the memory device. The controller is configured to receive a read command from a host device to read data from the memory device, fetch the read data from the memory device, check metadata associated with the read data, determine if the metadata corresponds to the read command, and provide modified read data to the host device when the metadata does not correspond to the read command.

The controller is further configured to modify the read data, wherein modifying the read data includes either corrupting the read data, encrypting the read data, or replacing the read data with debug information. The controller is further configured to fetch the metadata prior to fetching the read data. The controller is further configured to store the metadata that is fetched in a comparison unit. The controller is further configured to calculate cyclic redundancy code (CRC) for the read data and provide the calculated CRC to the comparison unit. The metadata that is fetched includes an expected CRC, an expected namespace (NS), and an expected logical block address (LBA). The read command includes an actual CRC, an actual NS, and an actual LBA. The controller is configured to compare the expected CRC, the actual CRC, and the calculated CRC and modify the read data when the expected CRC, the actual CRC, and the calculated CRC do not match. The controller is configured to compare the expected NS and the actual NS and modify the read data when the expected NS and the actual NS do not match, where modifying the read data comprises replacing the read data with random generated data. The controller is configured to compare the expected LBA and the actual LBA and modify the read data when the expected LBA and the actual LBA do not match, where modifying the read data comprises replacing the read data with random generated data.

In another embodiment, a data storage device includes a memory device and a controller coupled to the memory device. The controller includes a host interface module (HIM) and a direct memory access (DMA) coupled to the HIM. The DMA is configured to fetch metadata associated with a read command, wherein the read command has a first data identifier, and wherein the fetched metadata has a second data identifier, fetch data associated with the read command, wherein the fetched data has a third data identifier, determine if the first data identifier, the second data identifier, and the third identifier match, and provide a requester of the read command either unmodified fetched data when the first data identifier, the second data identifier, and the third identifier match or modified fetched data when the first data identifier, the second data identifier, and the third identifier do not match.

The modified fetched data is random data. The modified fetched data includes debug information. The modified fetched data is either re-encrypted fetched data or random data. The modified fetched data further includes debug information. The DMA includes a multiplexer (MUX) switch. The first data identifier, the second data identifier, and the third data identifier are provided to the MUX switch. The first data identifier includes an actual an actual cyclic redundancy code (CRC), an actual namespace (NS), and an actual logical block address (LBA). The second data identifier includes an expected CRC, an expected NS, and an expected LBA, and the third data identifier includes a calculated CRC. The determining if the first data identifier, the second data identifier, and the third identifier match comprises determining if the actual CRC, the expected CRC, and the calculated CRC match, determining if the actual NS and the expected NS match, and determining if the actual LBA and the expected LBA match.

In another embodiment, a data storage device includes memory means and a controller coupled to the memory means. The controller is configured to provide modified data in response to a read command when there is a mismatch between either metadata associated with read data corresponding to the read command and the read command or a calculated cyclic redundancy code (CRC) of the read data and the read command.

Providing modified data includes providing incorrect data to a requester of the read command.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
receive a read command from a host device to read data from the memory device;
fetch the read data from the memory device;
check metadata associated with the read data;
determine if the metadata corresponds to the read command; and
provide modified read data to the host device when the metadata does not correspond to the read command, wherein the controller is further configured to fetch the metadata prior to fetching the read data, wherein the controller is further configured to store the metadata that is fetched in a comparison unit, wherein the controller is further configured to:
calculate cyclic redundancy code (CRC) for the read data; and
provide the calculated CRC to the comparison unit, wherein the metadata that is fetched includes an expected CRC, an expected namespace (NS), and an expected logical block address (LBA), and wherein the read command includes an actual CRC, an actual NS, and an actual LBA, wherein the controller is configured to:
compare the expected CRC, the actual CRC, and the calculated CRC; and
modify the read data when the expected CRC, the actual CRC, and the calculated CRC do not match.

2. The data storage device of claim 1, wherein the controller is configured to:
compare the expected NS and the actual NS; and
modify the read data when the expected NS and the actual NS do not match, where modifying the read data comprises replacing the read data with random generated data.

3. The data storage device of claim 1, wherein the controller is configured to:
compare the expected LBA and the actual LBA; and
modify the read data when the expected LBA and the actual LBA do not match, where modifying the read data comprises replacing the read data with random generated data.

4. A data storage device, comprising:
a memory device;
a controller coupled to the memory device, wherein the controller comprises:
a host interface module (HIM); and
a direct memory access (DMA) coupled to the HIM, wherein the DMA is configured to:
fetch metadata associated with a read command, wherein the read command has a first data identifier, and wherein the fetched metadata has a second data identifier;
fetch data associated with the read command, wherein the fetched data has a third data identifier;
determine if the first data identifier, the second data identifier, and the third identifier match; and
provide a requester of the read command either:
unmodified fetched data when the first data identifier, the second data identifier, and the third identifier match; or
modified fetched data when the first data identifier, the second data identifier, and the third identifier do not match, wherein the DMA comprises a multiplexer (MUX) switch, wherein the first data identifier, the second data identifier, and the third data identifier are provided to the MUX switch, wherein the first data identifier includes an actual cyclic redundancy code (CRC), an actual namespace (NS), and an actual logical block address (LBA), wherein the second data identifier includes an expected CRC, an expected NS, and an expected LBA, and the third data identifier includes a calculated CRC.

5. The data storage device of claim 4, wherein the controller is further configured to fetch the metadata prior to fetching the read data.

6. The data storage device of claim 5, wherein the controller is further configured to store the metadata that is fetched in a comparison unit.

7. The data storage device of claim 6, wherein the controller is further configured to:
   calculate cyclic redundancy code (CRC) for the read data; and
   provide the calculated CRC to the comparison unit.

8. The data storage device of claim 7, wherein the metadata that is fetched includes the expected CRC, the expected NS, and the expected LBA, and wherein the read command includes an actual CRC, an actual NS, and an actual LBA.

9. The data storage device of claim 4, wherein the modified fetched data is a re-encrypted fetched data, and wherein the re-encrypting uses a system defined key.

10. The data storage device of claim 4, wherein the modified fetched data includes debug information.

11. The data storage device of claim 4, wherein the modified fetched data is re-encrypted fetched data, and wherein the modified fetched data further includes debug information.

12. The data storage device of claim 4, wherein the first data identifier, the second data identifier, and the third data identifier are provided to the MUX switch.

13. The data storage device of claim 4, wherein the determining if the first data identifier, the second data identifier, and the third identifier match comprises:
   determining if the actual CRC, the expected CRC, and the calculated CRC match;
   determining if the actual NS and the expected NS match; and
   determining if the actual LBA and the expected LBA match.

14. The data storage device of claim 4, wherein the modified fetched data is a re-encrypted fetched data, and wherein the re-encrypting uses a system defined key.

15. The data storage device of claim 4, wherein the modified fetched data includes debug information.

16. The data storage device of claim 4, wherein the modified fetched data is re-encrypted fetched data, and wherein the modified fetched data further includes debug information.

17. The data storage device of claim 4, wherein the first data identifier, the second data identifier, and the third data identifier are provided to the MUX switch.

18. The data storage device of claim 4, wherein the DMA includes a metadata unit, a response unit, a request unit, a data unit, a comparison unit, and a CRC unit.

19. The data storage device of claim 18, wherein the request unit is configured receive a new command for read data.

20. The data storage device of claim 19, wherein the read data of the new command includes pointers for data and metadata in volatile memory, such as static random access memory (SRAM) or dynamic random access memory (DRAM), along with namespace and LBA of the data.

* * * * *